United States Patent [19]
Duffy et al.

[11] 3,995,074
[45] Nov. 30, 1976

[54] METHOD FOR THE MANUFACTURE OF FASTENERS

[75] Inventors: Richard J. Duffy, Salem; Richard M. Elliott; Philip J. Rodden, both of Beverly, all of Mass.

[73] Assignee: USM Corporation, Boston, Mass.

[22] Filed: Apr. 28, 1975

[21] Appl. No.: 572,199

Related U.S. Application Data

[62] Division of Ser. No. 396,094, Sept. 10, 1973, Pat. No. 3,894,509.

[52] U.S. Cl. .................. 427/181; 427/195; 427/235; 427/236; 427/238; 427/239; 427/345
[51] Int. Cl.² .................. B05D 7/22; B05D 3/02
[58] Field of Search .......... 118/308, 309, 312, 317, 118/318; 427/183, 181, 185, 195, 235, 236, 238, 239, 345; 10/10 R, 86 A

[56] References Cited
UNITED STATES PATENTS

| | | | |
|---|---|---|---|
| 3,291,631 | 12/1966 | Smith | 118/317 X |
| 3,294,139 | 12/1966 | Preziosi | 10/10 P X |
| 3,385,261 | 5/1968 | Wittemann et al. | 118/317 |
| 3,452,714 | 7/1969 | Burke et al. | 118/308 X |
| 3,530,827 | 9/1970 | Burke | 118/308 X |
| 3,592,676 | 7/1971 | From et al. | 118/309 X |
| 3,720,533 | 3/1973 | Gallagher | 118/308 X |
| 3,797,455 | 3/1974 | Scheffer | 118/308 |
| 3,858,262 | 1/1975 | Duffy | 10/10 P X |

*Primary Examiner*—Ronald H. Smith
*Assistant Examiner*—Shrive P. Beck
*Attorney, Agent, or Firm*—Aubrey C. Brine; Richard B. Megley; Vincent A. White

[57] ABSTRACT

A method is provided for the continuous manufacture of self-locking internally threaded fasteners having a locking body or patch comprised of resilient thermoplastic material, applied to the fastener in powder form. A support member having a plurality of cavities for receiving said fasteners, and a nozzle associated with each of said cavities, is moved along a path through a plurality of locations wherein the fastener is deposited at a cavity aligned with a respective nozzle at a first location, material is forced through the nozzle onto the fastener at a second location, the fasteners are removed from the respective support at a third location, and the nozzles are purged of material at a fourth location prior to the initiation of a subsequent sequence of operations by the apparatus.

4 Claims, 9 Drawing Figures

METHOD FOR THE MANUFACTURE OF FASTENERS

This is a division of application Ser. No. 396,094, filed Sept. 10, 1973, now U.S. Pat. No. 3,894,509.

BACKGROUND OF THE INVENTION

The present invention relates to improved apparatus for the manufacture of self-locking internally threaded elements and more particularly to a device for the continuous manufacture of elements such as fastners wherein the self-locking feature is obtained through a deformable plastic patch secured onto the threaded internal surface of the element.

In U.S. Pat. No. 3,858,292 entitled "Method of Making Self-Locking Internally Threaded Articles" filed in the name of R.J. Duffy, and assigned to the assignee of the present invention, there is disclosed a method and apparatus for making a self-locking threaded element which avoids the difficulties of resin deposit on the end faces of the threaded element, is effective to deposit resin on the threaded surface in the selected area with a minimum of spatter on other portions of the threaded surface. In that method and device as disclosed, a nut or other internally threaded member was heated, and while mounted with its axis in an up-and-down position was sprayed with finely divided resin particles which were caught and built up on the heated surface to form a plastic body. While the apparatus disclosed in that application has proven quite satisfactory for practicing the method disclosed therein, it has been found that in the mass production of such internally threaded elements, as is desirable for a commercial application of the method, improvements may be made to the apparatus.

For example, automatic means may be provided to continuously move the internally threaded elements through the various stations in which the elements are loaded, the patch is applied to the elements, and the elements are unloaded at a substantial rate. In so doing, it has been found that small amounts of resin material left on the various components of the apparatus is quite detrimental to the elimination of the material deposited on the end surface, or end lead threads of the element. Additionally, in order to insure that the self-locking feature is obtained, the element while being moved through the device in a continuous manner, must be precisely located such that the patch is received at a specific location on the internal threads.

In view of the above therefore, the present invention has as an object to provide an improved device for the manufacture of self-locking internally threaded elements wherein a locking body or patch comprised of resilient thermoplastic material is applied to the element at a precise location, in powdered form.

A further object of the invention is to provide a device for the continuous manufacture of self-locking internally threaded elements which is simple in operation and relatively inexpensive to manufacture and operate.

Still another object of the invention is to provide a device for the manufacture of self-locking internally threaded elements which is automatic, requires little maintenance, is reliable, and is therefore readily adaptable to a manufacturing operation wherein a plurality of such devices may be operated by a single operator.

SUMMARY OF THE INVENTION

The above objects of the invention are achieved by providing apparatus for applying locking patches of resilient thermoplastic resin to internally threaded articles having openings at both ends of the threaded portion which, in general, comprises support means for receiving the internally threaded articles, and means for moving the support means along a predetermined path wherein the article is received on the support means at a first location. Conduit means connected to the support means are provided having an opening formed therein which is directed toward that portion of the threads of the article supported on the support means to which the patch is to be applied. The conduit means has a second opening at the opposite end for receiving a thermoplastic resin in powdered form to be deposited on the threads of the article, and a discharge means is disposed for providing thermoplastic material under pressure when in registry with the second opening. A vacuum means is provided for applying a negative pressure when in registry with the second opening and the means for moving the support means along a predetermined path is effective to move the support to the location where an article is received on said support means and then to a location where the conduit means opening is moved into registration with the discharge means and subsequently to a location where the second opening is moved into registration with the vacuum means.

In a continuous cycle of operation, therefore, the conduit means are effective to apply the thermoplastic resin to the particular portion of the internal threads of an article, and are then purged of the thermoplastic resin prior to the next operation.

BRIEF DESCRIPTION OF THE DRAWING

For a more complete understanding of the invention, reference should be made to the following description of a preferred embodiment, taken in conjunction with the drawing thereof, wherein.

DESCRIPTION OF THE PREFERRED EMBODIMENT

Figure 1:
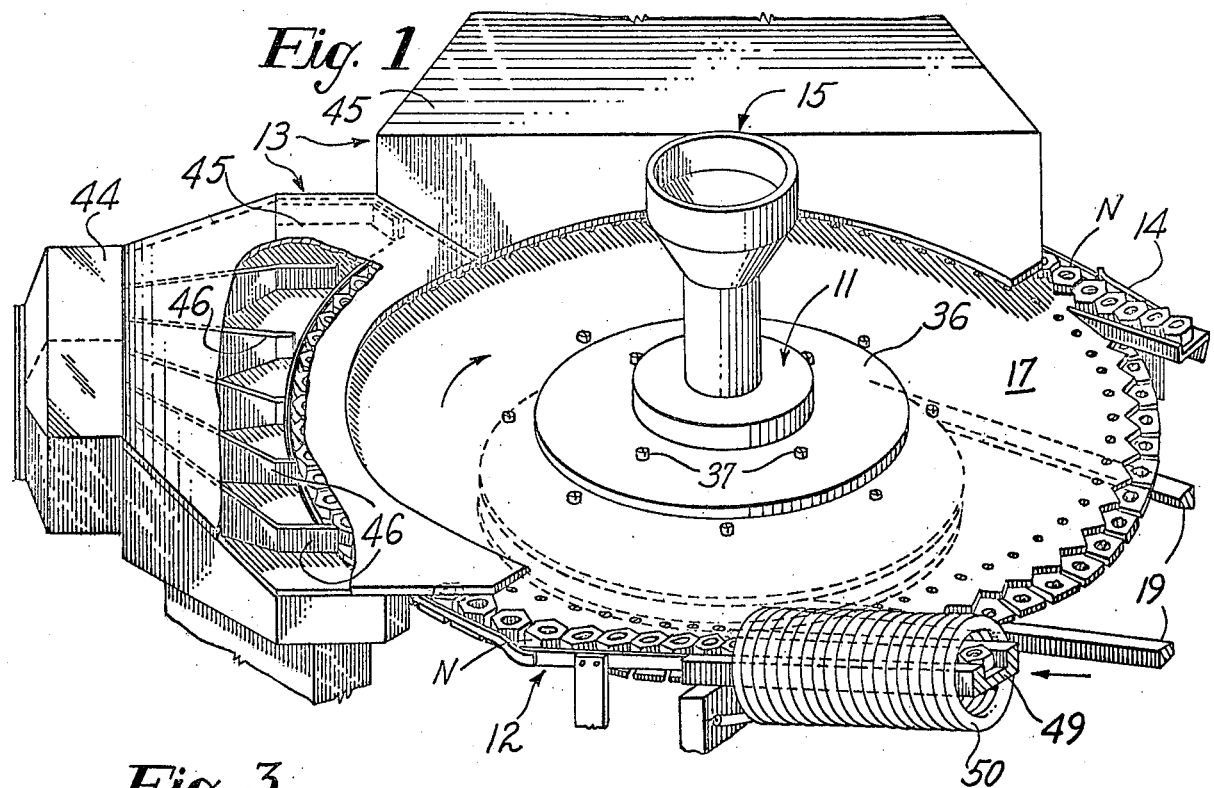
FIG. 1 is a perspective view showing a device for the manufacture of self-locking threaded fasteners constructed in accordance with the teachings of the present invention.
Figure 2:
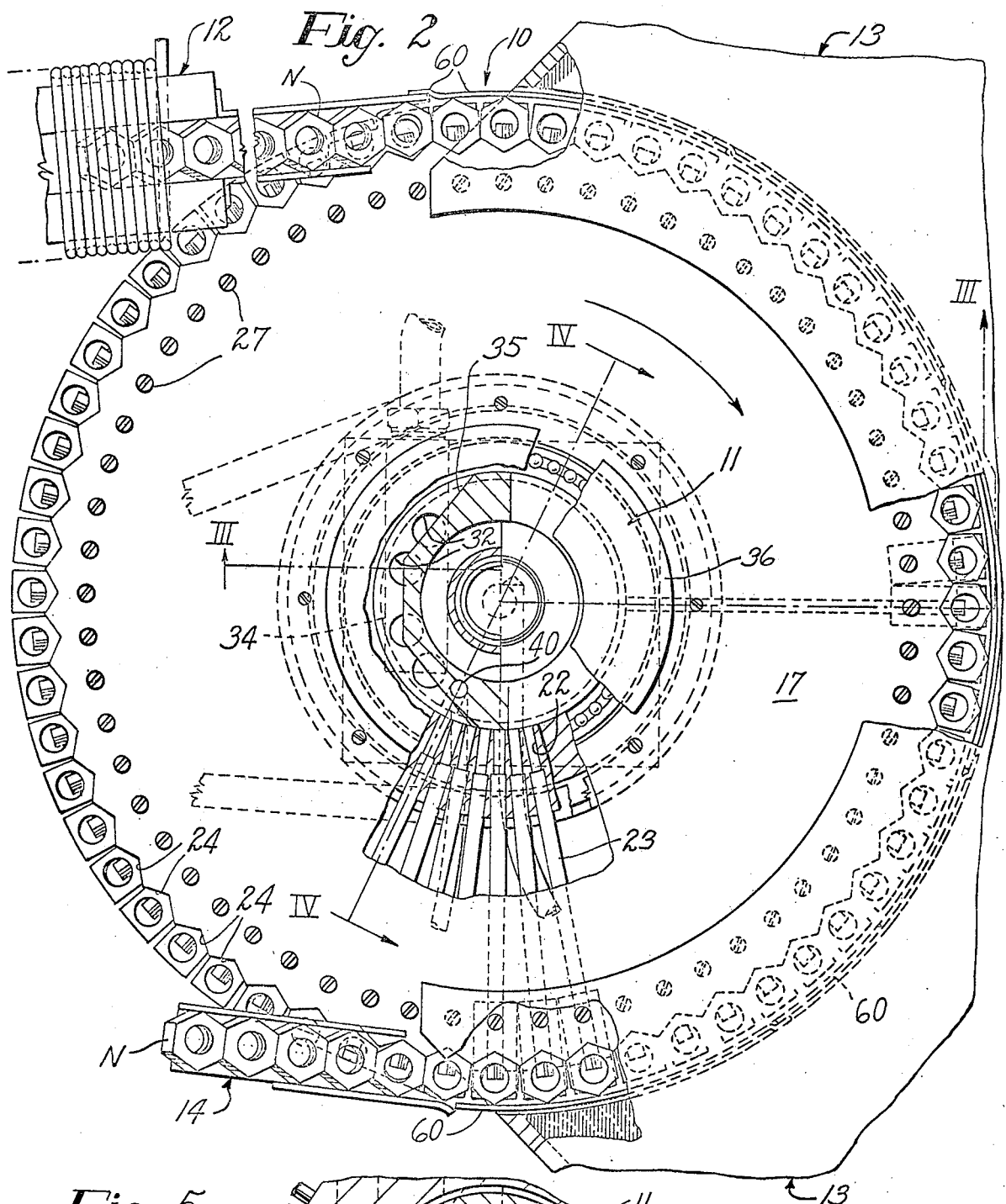
FIG. 2 is a top plan view of the device shown in FIG. 1 having portions of the structure broken away to reveal underlying features.

Referring to the drawing, and in particular to FIGS. 1 and 2, there is shown apparatus for the manufacture of a self-locking internally threaded article in the form of a hex nut N which generally comprises a rotatably mounted transport member in the form of a table 10 movable along a predetermined rotary path about its central axis, in the direction shown by the arrows of FIGS. 1 and 2.

As the table 10 is continuously rotated about a fixed housing 11, a point on the table 10 will be seen to pass through a plurality of stationary work areas which will be termed stages of the operation for the purposes of the present description.

During the first stage of operation, a loading chute 12 which is inclined downwardly toward the surface of the table 10 is effective to deposit the hex nut N onto the table, and during a next stage, a resilient thermoplastic material in powdered form is applied to the internal threaded surface of the nut. This stage is substantially enclosed by a vacuum hood 13, the operation of which will be explained in detail hereinbelow.

During the next subsequent stage, a second upwardly inclined chute 14 having one end disposed adjacent the table 10 is effective to unload the nut N from the table 10, which is followed by the subsequent stage of operation which substantially covers that portion of the table 10 located between the unloading station and the loading station, and wherein the means for applying thermoplastic material to the nut N are purged of residual material, and are readied for the next sequence of operation.

It will be noted in FIG. 1, that the stationary housing 11 is provided with a funnel shaped hopper 15 which serves to receive the powdered resilient thermoplastic resin for application to the internal threads of the nuts N, which operation will be explained in detail below.

Referring now to FIGS. 2–5, and in particular to the table 10, the table is shown to comprise a hub 16 having a plate 17 affixed to its uppermost surface and a groove 18 for receiving a V-belt 19 which is connected to a motor (not shown). The hub 16 is slidingly engaged on the central housing 11 and is caused to rotate by the motor driven belt 19, the hub being supported by a pair of bearings 20 and 21.

Referring still to these FIGS. 2–5, the hub 16 is shown to have formed therein a plurality of circular cross section apertures 22 each having an opening internally toward the housing 11 and receiving at the opposite end a tube 23, the tube and aperture forming in combination a conduit means, as will be explained further in detail.

As best shown in FIG. 2, the outer periphery of the plate 17 is provided with a plurality of V-shaped slots 24, each of which has a tongue 25 disposed below and extending outwardly from the respective slot to form a pocket of cavity for receiving a threaded hex nut N, of the type shown. Each of the tubes 23 has a channel bracket 26 connected to it by welding or other means and a plurality of fasteners 27 serve to connect the bracket 26 to the plate 17, with respective tongue 25 sandwiched therebetween. Each of the tongues 25 has a circular opening provided therein and the outer end of the tube 23 is bent upwardly at approximately a 45° angle to extend through the circular opening in the tongue, and slightly above the tongue to a position which would locate the outer end of the tube within a hex nut received in the pocket formed by the respective V-shaped slot 24.

Figure 3:
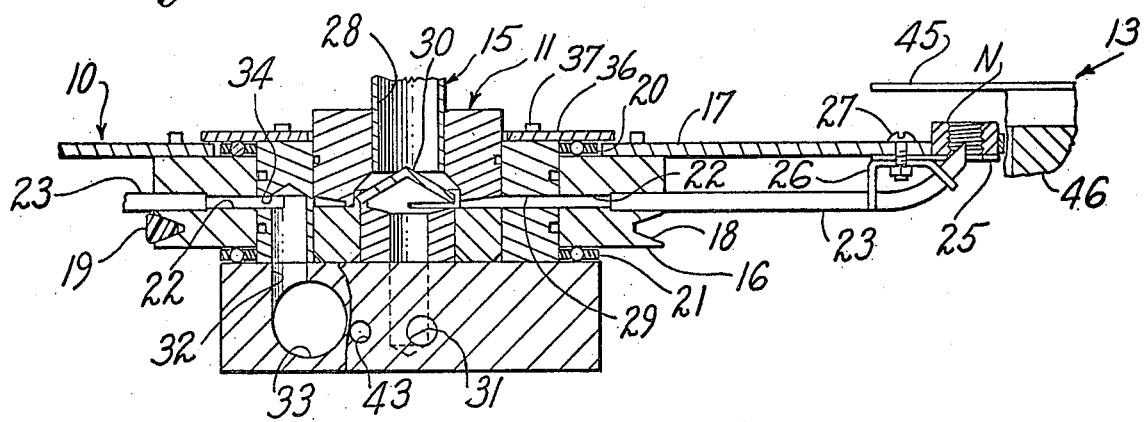
FIG. 3 is a sectional elevational view taken along the line III—III of FIG. 2 showing details of the construction.
Figure 4:
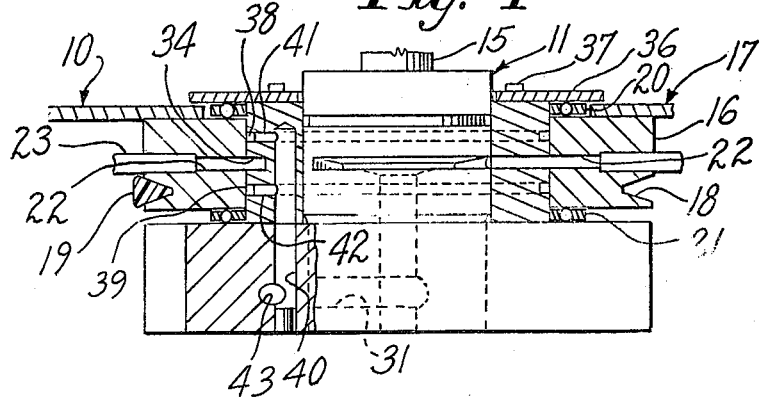
FIG. 4 is a sectional elevational view taken along the line IV—IV of FIG. 2 showing further details of the structure.
Figure 5:
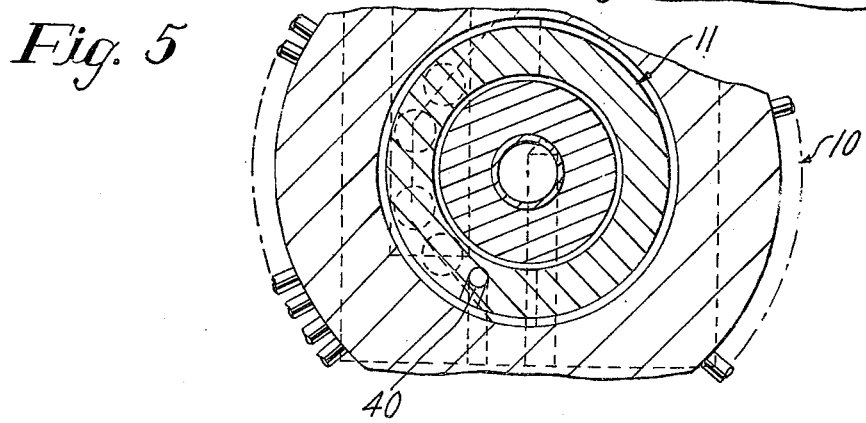
FIG. 5 is a sectional plan view taken along the lines V—V of FIG. 4 showing that portion of the structure in detail.

Referring in particular to FIGS. 3, 4 and 5, the housing 11 is seen to have formed therein a hollow central opening 28 into which the hopper 15 is introduced, and which extends to a point near the bottom of the housing. The bore 28 is flanged outwardly near its midpoint, and has a slotted opening 29 which extends for substantially 180° around the housing 11 and leads from the flanged out portion of the bore 28 externally of the housing 11 and is in alignment with the plurality of apertures 22, when the table 10 is located on the housing 11, A conical shaped divider 30 is located in the flanged out portion of the bore 28 and is attached to the wall of the bore at that portion of the wall which is not cut away by the slotted opening 29. Thus, the divider 30 separates the upper portion of the bore 28 from the lower portion over the entire circumference of the bore with the exception of that portion where the slotted opening 29 is located.

An inlet opening 31 extends into the bore 28 at its lowermost extremity and is connected to a source of fluid pressure such as an air pump (not shown).

Diametrically opposite the slotted opening 29 and near the outer edge of the housing 11 are located a plurality of vertical circular cavities 32, four in number, which are best shown in FIG. 2.

Each cavity 32 has its lower end terminating in a larger diameter chamber 33, and its upper end terminating at a second slotted opening 34 similar to the diametrically opposed slotted opening 29. In this instance, the slotted opening 34 extends from the outer periphery of the hub 11 over a circumference of about 150° to an inner wall 35 as shown in FIG. 2. The slotted opening 34 is in alignment with the apertures 22 and therefore forms a flow path from the tubes 23 through the chamber 33 to which a vacuum source (not shown) is connected, when the tubes 23 are moved into the area over which the opening 34 is formed.

Referring in particular to FIGS. 3 and 4, it will be noted from the construction that the table 10 is readily removable from the hub 11 by virtue of the removable retaining plate 36 which is secured by four fasteners in the form of screws 37. When the screws 37 are removed, the retaining plate 36 may be lifted from the structure and the table 10 removed and subseqently replaced with a table serving to receive internally threaded fasteners of a different size or shape that those which are accommodated by the table 10 shown.

Because of the necessity to provide a sliding fit between the table 10 and the central housing 11, there is a distinct possibility of material which is being transferred between the tubes 23 and the slotted opening 29, or the tubes and the slotted opening 34, tending to escape between the outer surface of the hub 11 and the inner surface of the hub 16 of the table 10. There is provided, therefore, a pair of circumferential grooves 38 and 39 formed in the hub 11 and extending completely around the hub. At a point adjacent the inner wall 35 of the slot 34 a vertical bore 40 extends upwardly through the housing 11 and is provided with a pair of passages 41 and 42 which terminate at the grooves 38 and 39. A duct 43 extends from the bore 40 and is connected to a source of air pressure (not shown) for providing a fluid pressure in the bore 40. Thus, material having a tendency to find its way between the hub 16 and the housing 11 is inhibited from doing so, as any air flow occurring takes place from the grooves 38 and 39 into the openings 39 and 34.

Referring now to FIGS. 1 and 2, it will be observed that the vacuum hood 13 is divided into two portions for purposes of convenience only, and both portions taken together cover the area about the housing 11 wherein the slotted opening 29 is formed. That is, the entire area over which the thermoplastic resin in powdered form is fed through the tube 23 is covered circumferentially by the hood 13. Both of the portions of the hood 13 are constructed substantially the same and therefore only the first portion as shown in FIG. 1 will be described in detail.

Each of the hood portions is provided with a chamber 44 which is supplied with a negative pressure by vacuum producing means (not shown). A cover plate 45 extends outwardly from the hood 13 to a position over the table 10 which serves to cover a nut N located on the table. For the purpose of equalizing the vacuum throughout the hood 13, a plurality of partitions 46 are located within each of the portions of the hood 13 and serve to form a plurality of separate vacuum areas, each having substantially the same negative pressure to apply to the area above the nut N located adjacent to the opening of the hood.

Figure 6:
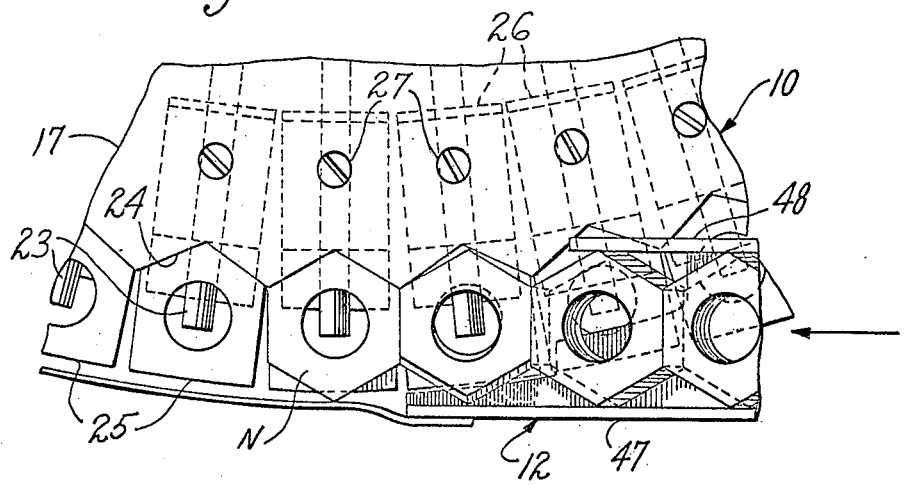
FIG. 6 is a plan view showing a portion of the structure depicted in FIG. 2, taken on an enlarged scale for clarity.
Figure 7:
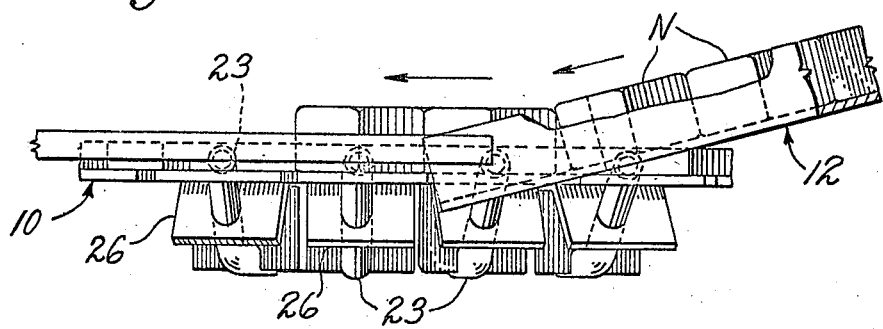
FIG. 7 is an elevational view of the structure shown in FIG. 6.

The feeding arrangement shown comprises the chute 12 which is supported adjacent the periphery of the table 10 and positioned with the lowermost discharge surface of the chute spaced slightly from the surface of the plate 17 and having an outer rail 47 extending beyond an inner rail 48 as best shown in FIGS. 6 and 7. The distance between the outer rail 47 and the inner rail 48 is substantially the width across the points of the hex portion of the nut N to be fed onto the table 10. Thus, as shown in FIGS. 6 and 7, the nuts orient themselves flat-to-flat when traveling down the chute 12 and are therefore aligned for engagement with the V-shaped slot 24 on the table 10. A segment 49 of the chute 12 is manufactured of a material with suitable non-inductive and heat-resistant properties, and extends through an induction coil 50 which is suitably sloped and located adjacent the chute segment for heating a nut N traveling through the segment. The nut N may be fed by any suitable commercial feeder, of the vibrating type or of any other type, and as such devices are well known in the art, they are not considered to be of importance in describing the present invention and therefore the feeder has not been shown.

Figure 8:
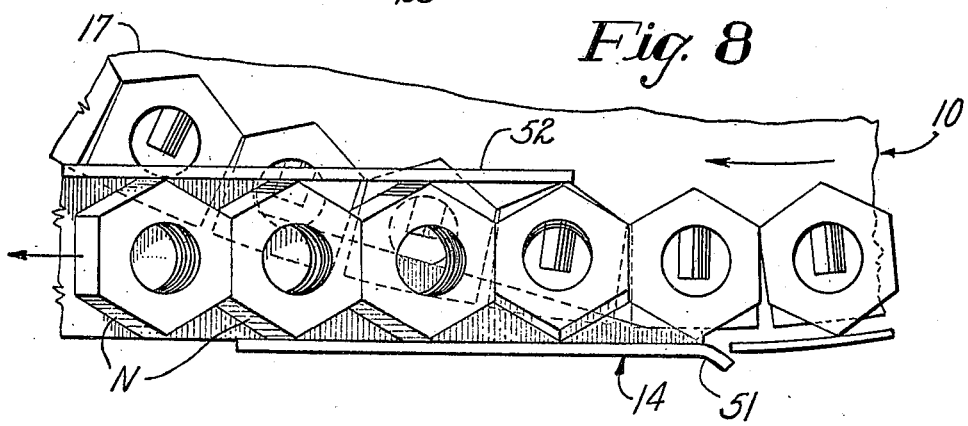
FIG. 8 is a plan view showing another portion of the structure depicted in FIG. 2, taken on an enlarged scale for clarity.
Figure 9:
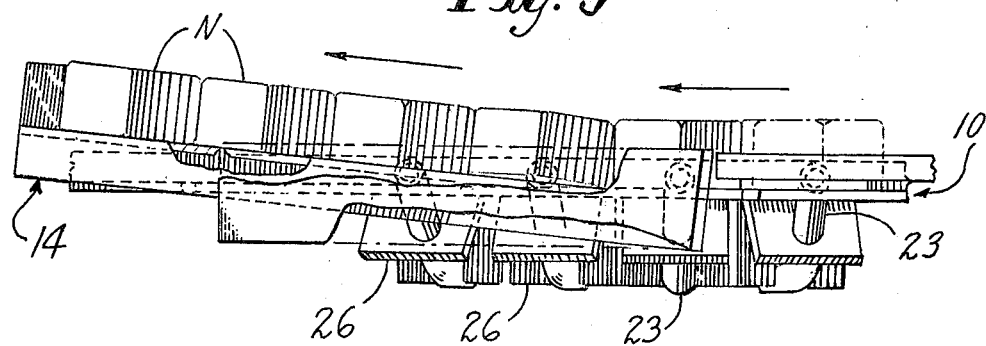
FIG. 9 is an elevational view of its structure shown in FIG. 8.

At the opposite side of the table 10 from the chute 12 there is located a similarly constructed chute 14, as best shown in FIGS. 8 and 9 taken in conjunction with FIG. 1. The chute 14 is effective to remove the nuts N from the table 10 and in a similar manner to chute 12 is sloped with its lowermost end, which in this instance is the nut receiving end, disposed adjacent the top of the table 10 and has an outer rail 51 which extends beyond an inner rail 52, both rails being spaced substantially the distance across the hex portion of a nut N. The uppermost end of the chute 14 may be left open providing for the nuts N to be dropped into a receptacle (not shown) or may lead to another chute or conveyance for carrying the nuts to a subsequent work or storage area.

With respect to the particular construction of the chuts 12 and 14, the outer rail 47 of the chute 12, as viewed in FIG. 6, forms a means for guiding the nut N into the proper location in the V-shaped slot 24 of the table 10 after which the nut may be held in place by gravity for the remainder of its travel on the table, or a plurality of spring clips 60 may be employed to provide a radial retaining force to the nuts, if necessary. Likewise, when removing the nut N, the outer rail 51 of the chute 14 serves to retain the nut in registry with the slot 24 until such time as the nut is lifted above the table and the inner rail 52 serves to combine with the rail 51 to guide the nut along the chute to its destination.

In operation, the apparatus as herein disclosed is first prepared by loading the hopper 15 with a thermoplastic resin in powdered form. The material may be a powder which is a mixture comprising a major portion of powdered polyamide resin, (nylon 11) and a minor proportion of epoxy resin having a particle size distribution such that less than 2% is retained on a No. 70 sieve about 90% retained on a No. 140 sieve and about 5% passing a No. 325 sieve. This is substantially the same material as disclosed in the prior referenced U.S. Pat. No. 3,858,262 filed in the name of Richard J. Duffy and assigned to the assignee of the present invention.

While the means for introducing thermoplastic resin in powdered form to the apparatus has been shown as a funnel type hopper 15, it should be understood that for the purposes of the invention the material could be provided from a remote source and continuously supplied by a suitable conduit to the housing 11. It should also be understood that the flow of resin material is metered by valving or other means well known in the art so as to control flow rate according to the production rate, nut size, thread size or temperature variations.

With the material introduced into the apparatus, the means for providing a vacuum to the chamber 33 and the duct 43, and the means for providing air pressure to the inlet opening 31 are activated. Also external to the housing 11, the means for providing a vacuum to the hood 13 is initiated, and the induction coil 50 is energized to provide heating of the nuts N as they are directed along the chute 12.

With the preliminary steps set forth above having been taken, the apparatus is in the ready state and the motor means for driving the belt 19 and means for feeding the nuts N onto the chute 12 are activated to initiate processing of a typical batch of internally threaded fasteners. As the table 10 rotates at about 10 revolutions perminute in the direction of the arrows shown in FIGS. 1 and 2, the nuts N are introduced into the chute 12 and travel flat-to-flat through the induction coil 50 where each nut is raised to a temperature sufficient to cause the above described thermoplastic powder to adhere to the threaded surface of the nut when contacted thereby, and to be fused by heat from the surface to form a continuous plastic body. As a nut N approaches the table 10 it is retained on the chute 12 by the outer rail 47 until it is in registry with a V-shaped slot 24 and thereby positioned over a respective tube 23 disposed with its discharge opening at the threaded opening of the nut. The table 10 is rotated at a constant speed (about 10 revolutions per minute) and each nut N remains on the table for about ½ revolution or about 3 seconds with the discharge opening of the hollow tube 23 disposed to project slightly into the threaded opening of the nut.

As the table 10 rotates, each tube 23 is moved such that its respective aperture 22 comes into registry with the slotted opening 29 and the nut located adjacent the tube discharge opening is simultaneously disposed below the cover plate 45 of the hood 13. Air is supplied through the inlet opening 31 and into the lower portion of the hollow bore 28 where it passes into the slotted opening 29. The air flows horizontally through a converging area to the slotted opening 29 past the powder slot formed by the wall of the bore 28 and the conical shape divider 30 where it picks up the powder and then passes through a diverging area. The powder is fed at a uniform rate to the powder slot and the converging-diverging areas produced by the air passing from the portion of the bore 28 adjacent the divider 30 and into the slotted opening 29 provides a slight suction or "Venturi effect" at the powder slot which is considered to draw the powder into the air stream. The slotted opening 29 and its powder slot between the divider 30 and the bore 28 extend for about 180° about the housing 11, and deposit of powder onto the heated nut N therefore takes place continuously over this arcuate length of travel.

In the embodiment shown, the table 10 is provided with about 60 tubes 23, each tube projecting slightly into the nut N at approximately 45°. The powder is thus guided through the tube 23 to strike the internal threads of the fastener at a point slightly above the lowermost thread and the air powder flow is adjusted such that very little powder impinges upon the uppermost thread. As the tube 23 and the associated nut N rotate together over the 180° segment, a steady, rather uniform flow of powder is projected into the nut. Simultaneously, the vacuum hood 13 is drawing excess material into the hood away from the nut N during the 180° segment. The flow of "vacuum air" through the internal opening in the nut, and across the top of the nut, prevents powder from adhering to the nut except where powder impinges directly from the tube 23 onto the nut threads.

After the tube 23 and associated nut N pass from the stage of operation where the aperture 22 is in registration with the slotted opening 29 (and consequently from beneath the hood 13), there is a small arc of about 15° wherein the aperture 22 faces the outer periphery of the housing 11, and therefore the tube 23 is substantially shut off. At about this point in the table movement, the nut confronts the leading edge of the chute 14 and while still engaged in the V-shaped slot 24 registers with the rail 51 of the chute. The nuts N are then forced into flat-to-flat engagement by continuous movement of the table 10 and are moved in a continuous stream between the inner rail 52 and outer rail 51 of the chute 14, to be removed from the table 10 to a receiving point.

During the next approximately 150° arc of rotational path, a next stage of operation takes place wherein each of the tubes 23 has its aperture 22 brought into registration with the slotted opening 34 which is connected to the chamber 33 to which a vacuum is being applied. Thus, through an arcuate distance of 150°, each of the tubes 23 has a vacuum drawn on it which evacuates any excess material from the tube 23 and the aperture 22.

As may be envisioned, in providing a tube 23 which is bent upwardly at a 45° angle to distribute the powdered material in the described manner on the internal threads of the nut N, particles of material may become impinged on the outermost surface of the tube orifice and therefore would be deposited on a subsequent nut as the nut in the heated condition was placed on the table and moved across the discharge orifice of the tube. By providing the vacuum chamber 33 and drawing the material inwardly away from the orifice of the tube 23 the material is substantially eliminated at the orifice, and the probability of depositing material at an undesirable location on a subsequent fastener is thereby substantially eliminated.

As the basic process herein carried out requires that the resin particles be forced upwardly as disclosed in the aforementioned patent application Ser. No. 314,854, the present structure uniquely solves those problems adherent in mass production of internally threaded fasteners where such process is employed. In the aforementioned patent application it was disclosed that an important feature of forcing the resin particles upwardly against the threaded surface was that those particles which are not caught on hot surfaces are borne upward by the gaseous stream and are either caught by hot surfaces of higher threads or are discharged through the upper opening portion of the nut, or other threaded fastener. If such resin particles are directed downwardly through the nut, resin could be collected only on the upper surfaces of the threads since gravity would not be available to carry resin to the thread surfaces opposite to the surfaces directly in line with the entering resin particles. Thus, in utilizing a system wherein the air entrained powder must be forced upwardly onto the threads of the fastener to achieve a process which is improved over processes heretofore known, the present invention has advantages which are numerous.

First, by keeping the tubes 23 in a clean condition, and locating the nut N precisely on the table 10 by virtue of the V-shaped slots 24, the first and last threads of the nut are maintained in clean condition so as to facilitate starting of the nut onto the male threaded fastener. The arrangement of locating and cleaning elements both minimizes any power deposit on the threads except in the area where the patch is desired, and also eliminates any powder deposit on the external nut surfaces.

The machine being simple in nature is of a minimal cost to manufacture and has a minimal cost of parts to change over for different size nuts. Thus, when it is desirable to apply a patch to a different nut, this is accomplished by merely removing the retaining plate 36 and lifting the table 10 from the housing 11, after which a new table and related chutes and hood may be applied, accommodating a different size fastener.

Additionally, down time of the machine is minimized due to the virtual elimination of clogging of any powder passageways and jamming of nuts in the feedways.

In summary, it will be observed from the above description that the application of first powder and air presssure to the tube 23 and then a vacuum serves several purposes. First it prevents any outwardly flow of resin which might then stick to the heated nut N outside surface while the nut is being positioned onto the table 10 or removed from the table, and second the vacuum draws any excess powder from the tubes 23 to prevent a gradual powder buildup and plugging of the tubes. An additional feature of the vacuum drawn through the tube 23 is that it maintains a flow of cool air through the tube's discharge orifice to prevent a gradual temperature buildup, and the possible resultant sticking of the powder to the tube.

Another advantageous feature of the present structure is in that the location and shape of the vacuum hood 13 relative to the nut N and the air velocity also effect the powder distribution on the nut and serves to assist the feeding of the powder in the "Venturi" area.

A further feature which is considered to be of importance in the present structure is the manner of feeding the nuts N onto the table 10 and the subsequent removal of the nuts from the table. As will be observed, the nuts are oriented flat-to-flat and may be visualized as a chain which meshes with the 120° slots 24 of the plate 27 which may be visualized as a sprocket. The rotation of the table 10 at uniform speed serves as the speed controller for the system. As each nut N approaches the lower end of the chute 12, it is lowered down over the orifice of a tube 23, and also gradually comes into meshing engagement with the V-shaped slot 24 of the plate 17. As the table 10 then rotates, the nut moves further forward. The nut is found to be guided into close engagement with the 120° slot by the outer rail 47 of the chute 12, even at speeds of approximately 600 fasteners per minute and, the centrifugal force is found to be minor on the table 10 referring only the force of gravity and the spring clips 60 where necessary to hold the nut N in place.

The chute 14 further serves to remove the train of nuts N from the table 10 by guiding them upwardly and retaining them into engagement with the V slots 24 on the plate 17 through contact with the outer rail 51.

Thus, it may be seen that the described structure serves to achieve the various objectives of the invention through a combination of elements which coact to provide apparatus for the continuous manufacture of self-locking internally threaded fasteners, which apparatus is an improvement over known devices.

Having thus described our invention, what we claim as new and desire to secure by Letters Patent of the United States is:

1. The method of applying a locking patch of resilient thermoplastic resin to an internally threaded article having an opening at both ends of the threaded portion comprising the steps of;
   supporting the article adjacent a conduit having an opening therein directed toward that portion of the internal threads to which the patch is to be applied; said article having a temperature sufficient to cause the thermoplastic powder to adhere to its surface;
   moving said article and conduit along a predetermined path to locate a second opening in said conduit into registry with a source of thermoplastic resin powder under pressure, forcing the resin through said conduit in a direction toward the article, removing the article from adjacent said conduit, and
   moving said conduit along said predetermined path to a position wherein air air is forced through said conduit in a direction away from the article- whereby excess powder residue is removed from said conduit opening.

2. The method of claim 1 which further includes the step of heating the article prior to moving said conduit and the article to locate said second opening into registry with said source of thermoplastic resin under pressure.

3. The method of claim 2 wherein said air is forced through said conduit in a direction away from the article by locating an opening in said conduit which is remote from said article into registry with a source of vacuum.

4. The method of claim 3 wherein said predetermined path of movement is circular.

* * * * *